April 23, 1935.  B. A. WITTKUHNS ET AL  1,998,948
GYROCOMPASS
Filed Nov. 10, 1932  3 Sheets-Sheet 1
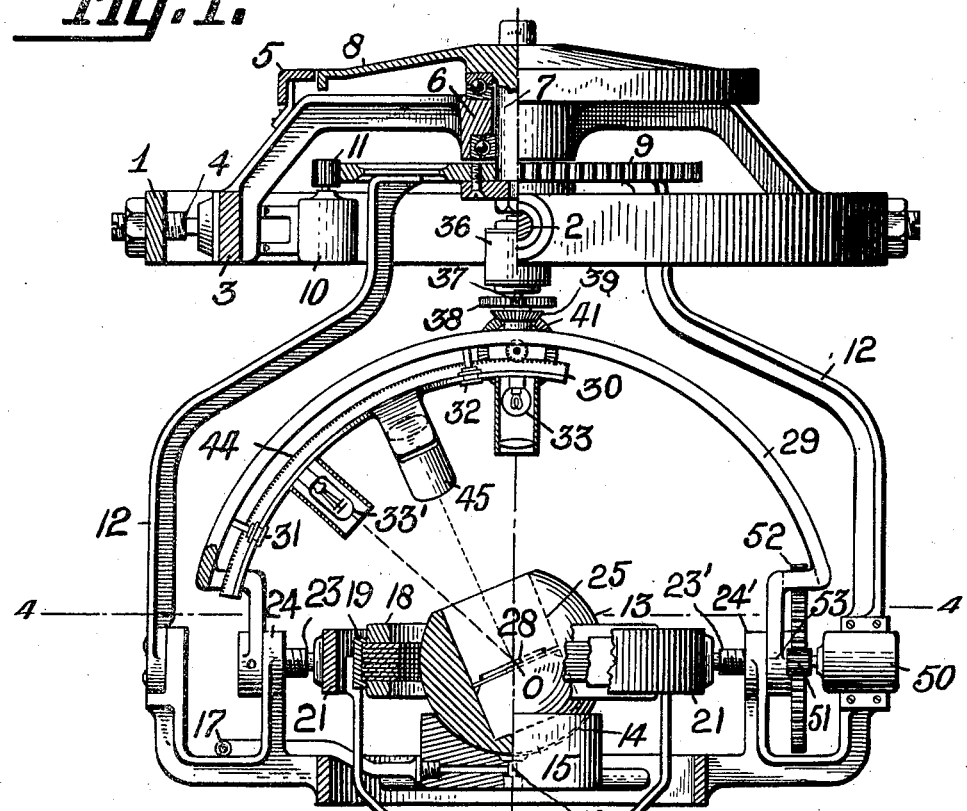
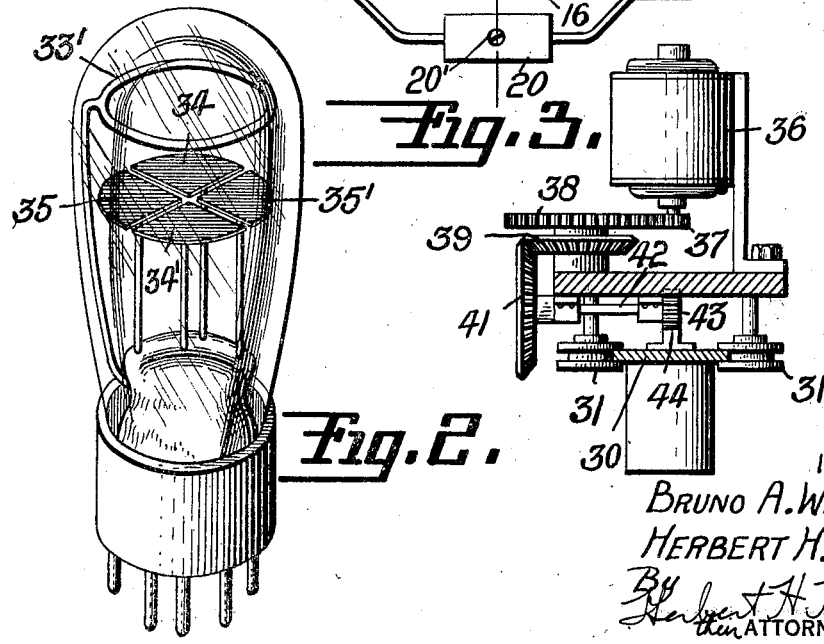
INVENTORS:
BRUNO A. WITTKUHNS,
HERBERT H. THOMPSON.
By Herbert H. Thompson
their ATTORNEY.

April 23, 1935.   B. A. WITTKUHNS ET AL   1,998,948
GYROCOMPASS
Filed Nov. 10, 1932   3 Sheets-Sheet 2
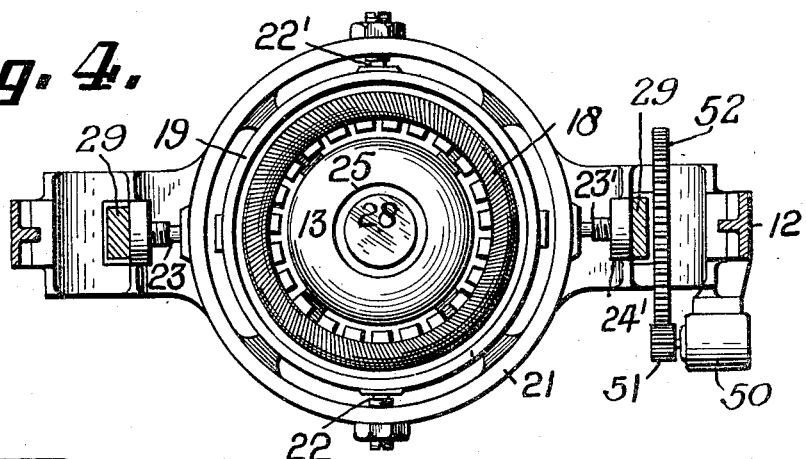
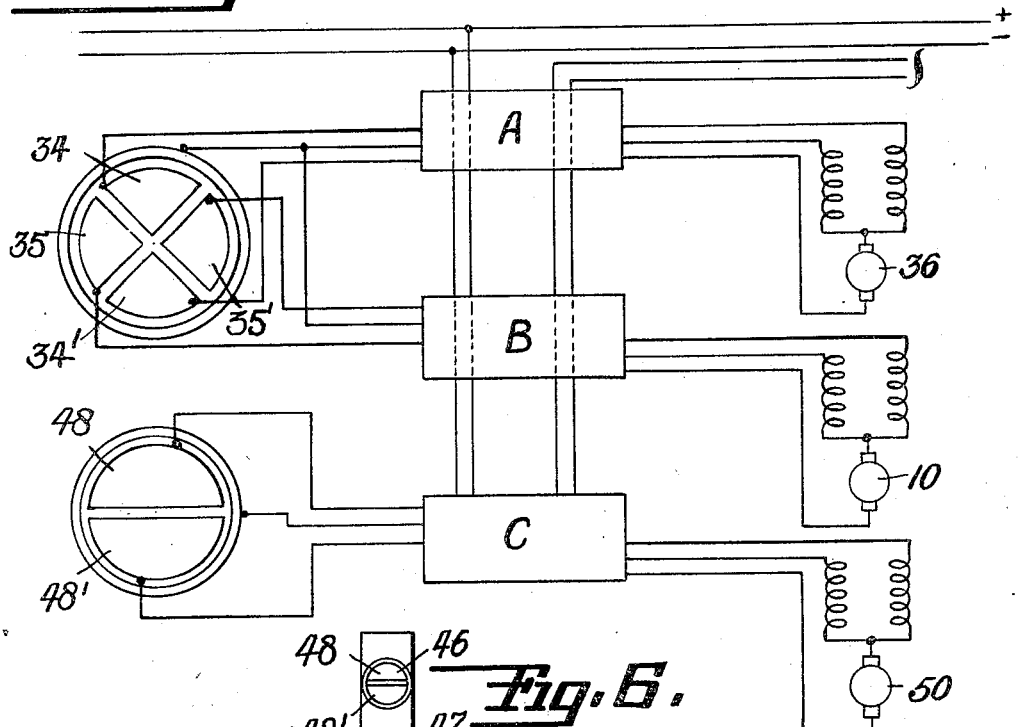
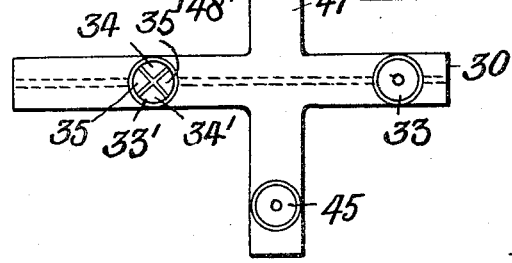
INVENTORS:
BRUNO A. WITTKUHNS
HERBERT H. THOMPSON.
By Herbert H. Thompson
their ATTORNEY.

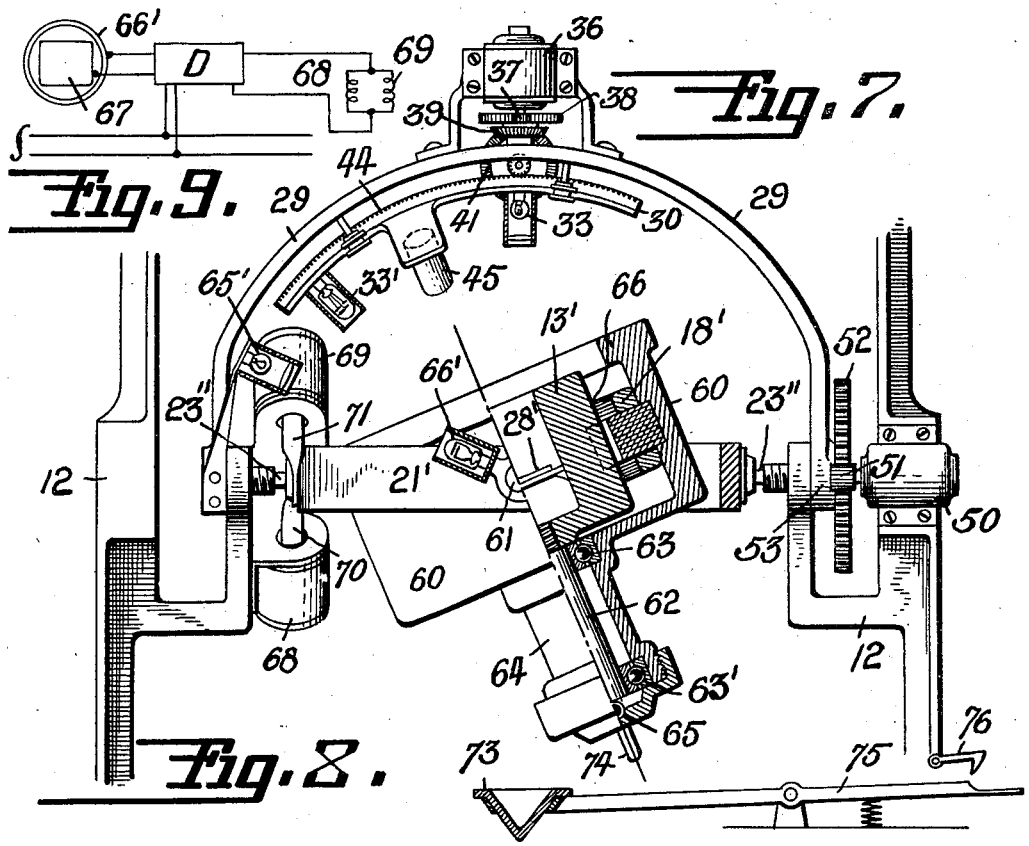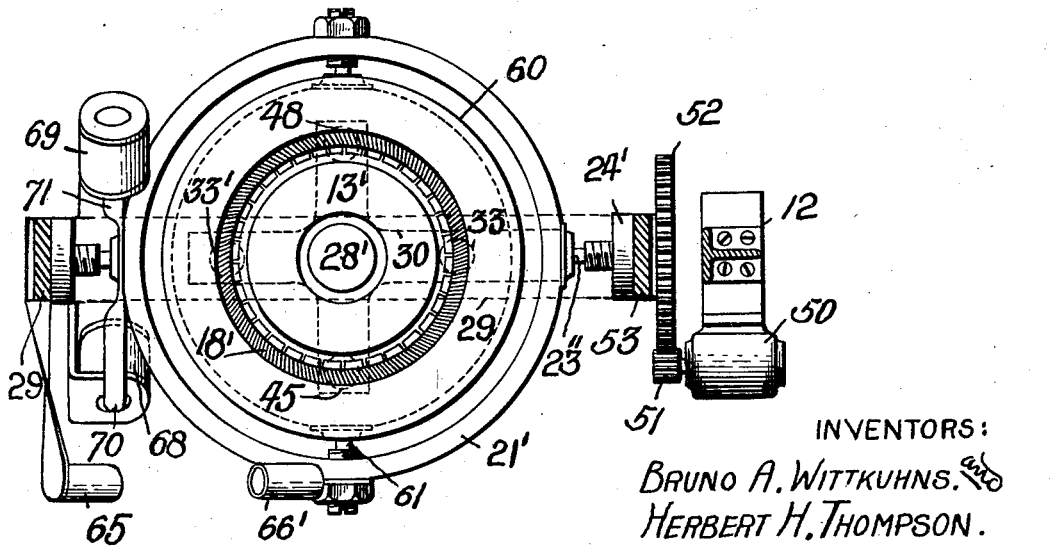

Patented Apr. 23, 1935

1,998,948

UNITED STATES PATENT OFFICE 1,998,948

GYROCOMPASS

Bruno A. Wittkuhns, Summit, and Herbert H. Thompson, Mountain Lakes, N. J., assignors to Sperry Gyroscope Company, Inc., Brooklyn, N. Y., a corporation of New York Application November 10, 1932, Serial No. 641,972

10 Claims. (Cl. 33—226)

In the prior joint application of Bruno A. Wittkuhns and William Anscott, Serial No. 562,282 filed September 11, 1931 for Artificial horizons, it is pointed out that a gyroscope of the type therein disclosed may be used as a compass as well as an inclinometer by making use of the fact that the plane of tilt of such a gyroscope, due to the earth's rotation, lies in the east-west plane. The present invention relates to this type of gyro compass, which may be referred to as an east-west compass as distinguished from the ordinary north-south compass, and the object of the invention is to construct such a device in as simple a manner as possible and so that the follow-up system will quickly respond to turning of the ship but will not be actuated by rolling and pitching. A compass of this type possesses several important advantages over the ordinary north-south compass because in it the gyroscope may be given three degrees of freedom so that it is substantially unaffected by acceleration forces. Furthermore, a compass of this type is inherently dead beat since it arrives at its settling position unenergized. Therefore, no damping device is needed, such as give rise in most compasses to errors on turning.

Referring to the drawings showing one form of the invention,

Fig. 1 is a north elevation, partly in section, of our gyro compass.

Fig. 2 is an enlarged view of one of the photoelectric cells used therein as a follow-up controller.

Fig. 3 is a detail showing how one of the tilt follow-up motors actuates the movable mounting for the controllers.

Fig. 4 is a plan view of the lower gimbal system and ball gyro, a section being taken through the supporting elements approximately on line 4—4 of Fig. 1, the gyro being vertical.

Fig. 5 is a simplified wiring diagram showing how the servo motor or follow-up motors are actuated from the several controllers.

Fig. 6 is a bottom plan view of the movable mounting for the controllers looking up from line 4—4 in Fig. 1.

Fig. 7 is a north elevation, partly in section, of a modified form of compass constructed according to our invention.

Fig. 8 is a plan view of the same, the gyro being vertical in this figure.

Fig. 9 is a wiring diagram of the tilt limiting device only.

While we illustrate our invention as applied to a ball type gyroscope, that is, a gyroscope in which all three degrees of freedom are provided by a single spherical air supporting bearing, it will be understood that our invention in some aspects at least is applicable to the ordinary type of gimbaled gyroscope. We have shown our compass as supported in the usual main gimbal ring 1 which is pivoted on axis 2 in a fixed support (not shown). Said gimbal in turn supports the spider 3 on axis 4 at right angles to the axis 2. The spider carries the usual lubber ring 5 and has journaled in the central hub 6 thereof the follow-up supporting frame 7 which may carry the compass card 8 at the top thereof. Said frame also carries the azimuth gear 9 which may be turned from the follow-up azimuth motor 10 through pinion 11. The follow-up frame also includes the downwardly extending framework or ring 12 which supports the gyroscope. In the form shown, the gyroscope consists merely of a spinning ball 13 supported on a spherical bearing 14 providing full three degrees of freedom in a block 15 fixed to the bottom of framework 12. Preferably the ball is supported by an air film between it and the support, which film may be either entirely self-generated or supplied in whole or in part from an air jet 16 in the bottom of the cup supplied from the pipe 17. Preferably the ball is hollowed out along a portion of its vertical axis as at 25 so that it will normally rotate about the axis of the bore, i. e., so that its maximum moment of inertia lies in a plane at right angles thereto, i. e., the equatorial plane.

Any suitable means may be provided for spinning the ball about a more or less vertical axis. As shown, the spinning means comprises a pendulous stator 18 normally located in a horizontal plane. A separate mounting is preferably provided for the stator by mounting it in a ring 19 rendered pendulous by a mass 20 secured therebelow which may be made laterally adjustable as by set screw 20', so that any desired inclination may be given the stator. Said ring 19 is pivoted within a gimbal ring 21 on pivots 22, 22' and the gimbal 21 in turn is pivoted about pivots 23, 23' in brackets 24, 24' on the framework 12. The stator, therefore, preferably constitutes an independent pendulum which not only spins the ball but exercises a limited erecting or aligning torque thereon tending to maintain the axis of the ball perpendicular to the axis of the stator, or, in other words, in the true vertical (if weight 20 is centrally positioned).

As above stated, the rotation of the earth will cause the ball to become inclined to the west and if it were not for the centralizing action of the stator, the inclination would increase so that (at the equator) the ball would turn a complete somersault in 24 hours. Owing to the counteraction of the stator, however, the angle of tilt may be limited to any desired amount, said angle preferably being on the order of 10 to 20 degrees and being controlled either or both by the positioning of mass 20 or by the closeness of the coupling between the stator and the ball as outlined in the prior application of R. E. Gillmor, Serial No. 493,729 filed November 6, 1930 for Gyroscopic compasses now Patent 1,972,882, Sept. 11, 1934.

In order to make such a device into a compass, it is necessary to provide a selective means for selecting the true azimuthal movements of the ball from the tilting movements caused by rolling and pitching of the support 12 and to indicate the same in a manner which can be read by the observer. To this end we have shown a plurality of controllers for actuating servo motors to select the movement desired. It will be understood that any suitable form of controller may be used, but we prefer to use in this instance a system of photo-electric cells and a light beam or beams. To this end we mount on the ball, or preferably within the same at the center thereof, a mirror 28, and we place above the same a ring 29 which is preferably pivoted in the brackets 24, 24' about the axis of pivots 23, 23'. Said ring can, therefore, tilt about an east-west axis. For providing motion about a north-south axis, we have shown an annular slide 30 mounted for circular movement between pairs of guide rollers 31 and 32 (see Figs. 1 and 3) about the center O of the ball. On this slide we mount the photoelectric cell controller or controllers and actuating lamps. One lamp 33 is shown as lying normally directly above the ball and the reflected beam therefrom normally falls equally on the four plates 34, 34', 35, 35' of a double or cruciform photo-electric cell controller 33', such as described in copending application by one of the joint applicants, Bruno A. Wittkuhns, Serial No. 587,273 dated January 18, 1932 for Light or ray controlled follow-up systems. With the controller arranged with the plates as shown in Figs. 2 and 5, it will be evident that if the beam moves up in the east-west plane it will move from plate 34' to 34, while if it moved downwardly the reverse would take place.

From this combination of plates we actuate through amplifier A a servo motor 36 which is geared to move the slide along the frame 29 so as to keep the photo cell in the beam. Said amplifier may be of the form shown in the aforesaid application but if desired both an A. C. and a D. C. supply may be used. As shown in Fig. 3, said motor is provided with a pinion 37 meshing with a gear 38 which has secured thereto a bevel gear 39. Said gear in turn meshes with a second bevel gear 41 on the shaft 42 of a pinion 43. The latter meshes with gear teeth 44 cut on the top of the annular slide. On the other hand, if the ball turns in azimuth about its vertical axis, the beam will be moved from plate 35 to 35', for instance, or vice versa, and this movement of the beam is made to actuate the azimuth motor 10 through amplifier B to revolve the entire follow-up frame and the compass card into the plane of tilt of the ball.

If no further means are provided it will be evident that motor 10 will also be actuated in case of relative tilt of the ball about a horizontal east-west axis, or in other words, by tilting of the follow-up frame about the ball out of the east-west vertical plane. Such tilting will cause violent actuation of the azimuth motor because the angle of tilt is small and the azimuth motor must turn the entire frame through an angle which varies at a much faster rate than the angle of tilt. Prior compasses of this type have largely failed to succeed because of failure to solve this difficulty. In my compass, on the other hand, I provide a means to prevent the apparent swinging of the ball support about the east west axis from actuating the azimuth motor. To this end I provide an additional controller which may also be of the photo-electric cell type. Said controller also comprises a lamp 45 and two-plate photo-electric cell 46 positioned on a curved crossbar 47 on said slide 30. Said lamp and cell are positioned midway between the aforesaid lamp 33 and cell 33', that is, normal to the plane of the mirror 28 with the cathodes 48, 48' one above the other, so that when the axis of the ball is in the vertical east-west plane the beam from the lamp 45 strikes equally between the two cathodes 48 and 48' of the cell. In case, however, the support becomes inclined out of the east-west plane, the beam will move up or down to one or the other of said plates, thus actuating the third servo motor 50 through amplifier C. Said motor is shown as connected by a pinion 51 to a gear 52 on the hub 53 of the ring 29 so as to maintain the plane of said ring in the plane of tilt of the axis of the ball about its east-west axis. Motor 50 will not be actuated, however, by turning of the ball in azimuth (i. e. about its vertical axis) since this will merely move the beam along the division line between the cathodes 48 and 48'. Since the cell 33' is also on said framework, it will at once be seen, if the cell 46 and motor 50 be made sufficiently sensitive, that the azimuth motor 10 will not be actuated by rolling and pitching movements but only by azimuthal movements of the ball relative to the support, because no relative tilting between the controller 33' and the ball is allowed to take place. In our compass, therefore, we not only effectively secure directional readings but stabilize the supporting elements in both planes from a single gyroscope which, as far as we are aware, has never been accomplished before. By this means we are enabled to obtain correct azimuth readings uninfluenced by rolling and pitching. Also, by using a ball type gyro we eliminate most of the complications and drawbacks of this type of compass by avoiding the errors introduced by multiplex gimbal rings and an inclined spinning axis.

As above intimated, our invention is applicable to a conventional type of gyroscope as well as to a ball gyroscope. In Figs. 7 to 9, our invention is shown as embodied in a novel type of gimbaled gyroscope. In this case the gyroscope comprises a rotor bearing casing 60 journaled for oscillation about a normally north-south axis on trunnions 61 in a gimbal ring 21', which in turn is mounted for oscillation about a normally east-west axis on trunnions 23'' in the frame 12 as in the first described form of the invention. Said casing is open at the top so that the rotor 13' is journaled therein at the bottom only on a long shaft 62 in spaced bearings 63, 63' in a downward extension 64 from the casing 60. A thrust bearing may be provided at the bottom of said shaft in the form of a ball 65. The rotor may be spun in any desired manner as by a polyphase winding 18' in the casing and a squirrel cage winding 66 on the rotor. Said rotor is preferably hollow and open at the top so that a mirror 28' may be mounted therein as in the first form of the invention. We, therefore, may employ the same system of control through lamps 33 and 45 and through photo-electric cells 33' and 48 as in Fig. 1, the motors 50 and 35 operating as described in connection with that figure. In this form of the invention, however, there is no restraining means to resist or limit the tilting of the gyroscope due to the earth's rotation, since preferably the gyroscope is perfectly balanced about its pivots 61 and 23". In order to limit the tilt to a predetermined angle, we have shown a third photo-electric control system comprising a lamp 65' mounted on the framework 29 and a photo-electric cell 66' secured to the gyroscopic casing or preferably to one trunnion 61 so as to tilt with the casing around the north-south axis. Said cell preferably may contain but a single plate 67 and is designed to excite one or more solenoids 68 and 69 mounted on framework 12 and adapted to exert a torque about the E—W axis. Said solenoids are designed to pull in the same direction, when excited, on cores 70 and 71 secured to gimbal ring 21'. Therefore, as the gyroscope approaches the limit of its tilt, the light beam gradually illuminates more and more of the surface of the plate 67, thus gradually increasing the strength of the solenoids until the force exerted thereon about the east-west axis is sufficient to cause a precession about the north-south axis equal to the tilt being imparted by the earth so that the apparent tilting of the gyroscope is arrested and fixed.

Since the gyroscope is in neutral equilibrium, we provide a centralizing or caging cone or lock 73 for locking the same when not running, said cone engaging a pin 74 on the bottom of the gyroscope when raised by any means, such as a treadle 75, in which position it may be locked by latch 76.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a ball compass, a gimbal support, a follow-up system mounted for rotation in azimuth within said support, a ball-like rotor having a universal mounting in said system for spinning about an axis slightly inclined to the vertical, a common means for spinning the ball and limiting the angle of tilt to the vertical, and means for orienting said follow-up system to maintain the same fixed in azimuth with reference to the plane of tilt of said rotor axis.

2. In a gyro compass, a free gyroscope mounted for spinning about an axis approaching the vertical, a rotatable gimbaled support therefor, a follow-up cruciform controller, a motor controlled by tilting of the gyroscope relative to said controller in one vertical plane for maintaining the controller in a predetermined position in that plane with respect to the spinning axis of the gyroscope, and a second motor controlled by tilting of the gyroscope relative to said controller out of the first-named plane for orienting said support to maintain it in a predetermined position with respect to said vertical plane of tilt.

3. In a gyro compass, a ball gyroscope, a cup for mounting the same for spining about an axis having a small predetermined tilt with respect to the vertical, a rotatable gimbaled support therefor, a selective controller responsive only to relative turning of the gyroscope and support out of the initial plane of tilt caused by the earth's rotation, an azimuth motor governed thereby for turning said support, and a normally horizontal spining means for said gyroscope adapted to exert a self-erecting torque on the gyroscope whereby the tilt is directly limited to said predetermined amount.

4. An east-west compass comprising a free gyroscope adapted to spin on an axis inclined somewhat to the vertical in the E—W plane, a follow-up support therefor, a follow-up controller responsive only to azimuthal turning of the spinning axis of said gyroscope, an azimuth motor controlled thereby to turn said support in azimuth, a movable mounting for said controller on said support, a second follow-up controller on said mounting responsive to only the relative tilt of the gyroscope out of the E—W plane, and a servo-motor controlled thereby for maintaining both controllers in said plane of tilt of the gyroscope.

5. An east-west compass comprising a free gyroscope adapted to spin on an axis inclined somewhat to the vertical in the E—W plane, a follow-up support therefor, a follow-up controller responsive only to azimuthal turning of the spinning axis of said gyroscope, an azimuth motor controlled thereby to turn said support and controller in azimuth, a mounting for said controller universally mounted on said support, a second controller thereon responsive only to tilt of said gyroscope relative to said second controller about a N—S axis, a third controller thereon responsive to tilt thereof relative to said gyroscope about an E—W axis, and servo-motors controlled by both said second and third controllers for stabilizing said mounting about both said axes without interfering with the azimuth control.

6. In a ball compass, a gimbal support, a follow-up system carried by said support and mounted for rotation in azimuth, a ball-like rotor having a universal mounting in said system for spinning about an axis slightly inclined to the vertical, a pendulous stator for spinning the ball and limiting the angle of tilt thereof, means universally mounting said stator in said system for independent movement, and means for orienting said support to maintain the same fixed in azimuth with reference to the plane of tilt of said rotor axis.

7. An east-west compass comprising a free gyroscope adapted to spin on an axis inclined somewhat to the vertical in the E—W plane, a follow-up support therefor, a follow-up controller responsive only to azimuthal turning of the spinning axis of said gyroscope, an azimuth motor controlled thereby to turn said support in azimuth, a movable mounting for said controller on said support, a second follow-up controller on said mounting responsive to only the relative tilt of the gyroscope out of the E—W plane, a servo-motor controlled thereby for moving said mounting to maintain both controllers in said plane of tilt of the gyroscope, and a third controller on said mounting and gyroscope for limiting the angle of tilt.

8. An east-west gyro compass, a rotor having an axial bore, means for spinning the same about the axis thereof, a reflector at the center of said rotor and positioned at right angles to said spin axis, a universal support for said rotor, a member universally mounted on said support, light responsive controllers on said member for stabilizing the same by rays reflected by said reflector, a follow-up ring mounted for turning in azimuth on which said support is mounted, and another light responsive controller on said member for turning said ring and responsive to ray reflections by said mirror caused by azimuthal movements of the rotor axis.

9. In a ball gyro compass, a ball having a bore along its spinning axis, a pivotally mounted support therefor, a reflector at the center of the ball with its optical axis coincident with said spinning axis, a follow-up support for the ball, a source of light thereon adapted to direct a beam on said reflector, a light responsive cell thereon adapted to receive the reflected beam, and a motor to orient said support in response to variations in beam distribution received by said cell.

10. In gyroscopic positional apparatus for ships, a gyroscope mounted with three degrees of freedom and with its spinning axis at a substantial angle to the horizontal, controlling means for detecting tilt of said gyroscope about either of two horizontal axes, orienting means brought into action thereby by tilt about one axis for orienting the apparatus in azimuth, and follow-up means brought into action by said controlling means by tilt about another axis for maintaining said first named means stabilized about said last named axis.

BRUNO A. WITTKUHNS.
HERBERT H. THOMPSON.